United States Patent [19]

Sterzel

[11] Patent Number: 4,769,296

[45] Date of Patent: Sep. 6, 1988

[54] BATTERIES COMPRISING HIGH ENERGY AND POWER DENSITY METHANOL/AIR FUEL CELLS

[75] Inventor: Hans-Josef Sterzel, Dannstadt-Schauernheim, Fed. Rep. of Germany

[73] Assignee: BASF Aktiengesellschaft, Ludwigshafen, Fed. Rep. of Germany

[21] Appl. No.: 119,495

[22] Filed: Nov. 12, 1987

[51] Int. Cl.$^4$ .................................. H01M 8/10
[52] U.S. Cl. ........................ 429/12; 429/32; 429/34; 429/41
[58] Field of Search ............... 429/12, 34, 30, 41, 429/27, 32, 40

[56] References Cited

U.S. PATENT DOCUMENTS 3,256,646  8/1970  Tannenberger et al. ............ 429/31
4,475,282  10/1984  Grimes et al. ....................... 429/34
4,666,798  5/1987  Herceg ................................ 429/12

FOREIGN PATENT DOCUMENTS 154247  2/1985  European Pat. Off. .

OTHER PUBLICATIONS

J. Electroanal. Chem., 183(1985) 391–394.
J. Electroanal. Chem., 179(1984) 303–306.
J. Electroanal. Chem., 199(1986) 311–322.

Primary Examiner—Anthony Skapars
Attorney, Agent, or Firm—Keil & Weinkauf

[57] ABSTRACT

In a battery composed of methanol/air fuel cells which in turn are composed of a cathode, an anode and a $CO_2$-permeable anion exchanger membrane as electrolyte, a plurality of cathodes and anodes are in a parallel arrangement in a common cathode compartment and anode compartment respectively.

4 Claims, 3 Drawing Sheets

BATTERIES COMPRISING HIGH ENERGY AND POWER DENSITY METHANOL/AIR FUEL CELLS

The present invention relates to a battery comprising methanol/air fuel cells which in turn are composed of a cathode, an anode and a $CO_2$-permeable anion exchanger membrane as electrolyte, wherein a plurality of cathodes and anodes are in a parallel arrangement in a common cathode compartment and anode compartment respectively.

In fuel cells, a fuel (in this case methanol) is electrochemically oxidized at an anode to carbon dioxide and water, while atmospheric oxygen is reduced at a cathode to hydroxyl ions ($OH^-$). Anode and cathode are separated by an electrolyte, in batteries comprising methanol/air fuel cells according to this invention by an OH-conducting polymeric anion exchanger membrane. If anode and cathode are connected via a consumer, electrons are made to flow from the anode to the cathode.

Heretofore no operable batteries composed of methanol/air fuel cells have been disclosed. In the prior art, methanol is catalytically converted to carbon dioxide and hydrogen, the carbon dioxide is separated off and the hydrogen is fed to the actual hydrogen/air fuel cell. The current densities obtained therein range from 0.2 to 0.3 $A/cm^2$.

Higher current densities of 1 $A/cm^2$ can be obtained in particular by means of porous, gas-permeable electrodes. The property of gas permeability is advantageous since, when the fuel cell is in operation, oxygen diffuses into the cathode and water and carbon dioxide diffuse out.

Such gas diffusion electrodes are described for example by Watanabe et al. (J. Electroanal. Chem. 183 (1985), 391-394). These electrodes are produced by sintering carbon black together with carbon black particles covered with catalyst and with or without polytetrafluoroethylene particles around a suitable offlead. The electrode obtained consists of a porous network in which the catalyst particles are in contact with one another to form a percolation network.

This reference to a percolation network is to be understood as meaning that there is a permanent connection between the catalyst particles, ie. the catalyst particles are touching.

The catalysts used for reducing the oxygen are customarily noble metals such as platinum or silver, to name but a few.

Less costly cathodes, where the use of expensive noble metals is avoided, can be manufactured from specific polymers which contain transition metals which are as described in EP-A-No. 154,247.

To manufacture a cathode from the polymers described therein, the offlead used is preferably a narrow wire mesh made, in particular, from stainless steel or copper. The mesh size is in general from 0.02 to 0.5 mm, and the free area accounts for not less than 20% of the total area. This offlead is then coated with an uncrosslinked polymer as described in EP-A-No. 154,247.

To prepare the catalytically active material, carbon black having a high specific surface area (for example within the range from 200 to 500 $m^2/g$) is rendered water-wettable by oxidation in air at about 600° C. and subsequent treatment with boiling nitric acid. This carbon black is then saturated with a dilute solution of the polymer, dried, thoroughly mixed with polytetrafluoroethylene powder and molded at from 150° to 200° C. around a suitable offlead in such a way as to leave open micropores and channels.

It has proven particularly advantageous to use porous cathodes in which a layer of an anion exchanger polymer has been deposited. This layer generally ranges in thickness from 0.01 to 1 $\mu m$, preferably from 0.05 to 0.5 $\mu m$, and, constitutionally, may correspond to the anion exchanger membrane used as solid electrolyte or, alternatively, be different therefrom.

Suitable anion exchanger membranes are in principle all the commercial membranes whose solid ion content is preferably within the range from 0.5 to 5 equivalents per kg of dry membrane.

Suitable base polymers for such anion exchanger membranes are for example copolymers which are obtainable by grafting vinylpyridines onto polytetrafluoroethylene or by chloromethylation of divinylbenzene-crosslinked polystyrene and subsequent quaternization with tertiary amines. It is also possible to use copolymers of vinylbenzyl chloride and divinylbenzene. To produce the ionic groups capable of anion exchange, these polymers are reacted with corresponding monomers, for example with a trialkylamine or multifunctional amines. Suitable multifunctional amines are for example diethylenetriamine and tetraethylenepentamine.

Suitable electrode base polymers are also polyvinyl chloride films appropriately modified by reaction with amines.

The anodes can likewise be a prior art anode for methanol/air fuel cells. At present there are still no electrodes available where the use of noble metals as catalysts for oxidizing the hydrogen can be completely dispensed with.

Suitable catalysts are in particular bimetallic catalysts based on platinum/ruthenium or platinum/tin, which, compared with pure platinum catalysts, have a higher activity and lead to lower overvoltages.

Processes for manufacturing such anodes are known per se and described in the literature (for example in J. Electroanal. Chem. 179 (1984), 303 or loc. cit. 199 (1986), 311).

Anodes of particularly high activity are obtained on using a carbon black having a high specific surface area within the range from 100 to 400 $m^2/g$ as support for the catalyst.

Unlike existing cation exchanger membranes used as solid electrolytes, the current transport in the methanol/air fuel cells described takes the form of the hydroxyl ions which are formed at the cathode migrating to the anode. In the course of their migration, the hydroxyl ions carry a solvate cloud of water molecules into the anode space. On the cathode side water is continuously removed by means of the air stream which is guided past the cathode. As a consequence, a concentration gradient in terms of water is developed from the anode side to the cathode side. This concentration gradient is balanced out by water migrating from the anode side to the cathode side. This compensates for the loss on the cathode side and gives a uniform water content on the cathode and anode side, so that no additional measures for moistening the membrare on one side of the electrode are necessary.

The hydrogencarbonate ions and/or $CO_2$ formed at the anode migrate, on account of their concentration gradient and the electrostatic field within the anion exchanger membrane, from the anode to the cathode, where, as a consequence of the low carbon dioxide partial pressure present there, the hydrogencarbonate ions dissociate into hydroxyl ions and carbon dioxide.

The carbon dioxide is removed in gas form in the air stream guided past the cathode.

For optimal utilization of the volume of fuel cell, it is prior art to utilize the compartments for air and fuel in such a way that the cathodes and anodes are arranged in respective mutually opposite cathode and anode pairs (see Prospects Of Fuel Cells With Alkaline, Solid-Polymer And Superacid Electrolytes As Power Sources For Electric Vehicles: S. Spinivasan, Seminar on Electric and Hybrid Vehicle Advanced Technology, Pasadena, Calif., Dec. 8-9, 1980).

The development of such novel fuel cells of high energy and power density throws up problems which hitherto had no particularly high priority in the technology of fuel cells. The raising of the current density from the previous level by 0.2 $A/cm^2$ to about 1 $A/cm^2$ necessitates constructional measures to minimize losses in the conductance of current from the electrodes. Since a voltage of only 1 V is discharged per cell, a battery composed of fuel cells is characterized in that it combines a low voltage, depending on the number of cells, with a high current. This necessitates high conductor cross-sections to minimize voltage loss. For reasons of conductor lay-out and since high currents coupled with low voltages are unfavorable for most consumers and regulatability likewise presents problems, a fuel cell battery should give off low currents coupled with high voltages. Advantageous operating voltages are those which correspond to the peak voltage of a standardized effective alternating voltage.

For example, it would be desirable to provide a fuel cell battery having a starting voltage of from 310 to 320 V to be able to convert this direct voltage via a semiconductor circuit into an alternating voltage of 220 V, for which no expensive and heavyweight transformer would be required.

To obtain high power and energy densities, volume utilization should be maximized, and to arrive at an acceptable unit cost, fuel cell batteries should consist only of a few different mass-producible parts.

It is an object of the present invention to design a battery comprising methanol/air fuel cells in such a way that ohmic losses be minimized, the total voltage be high and the parts required be economically mass-producible.

We have found that this object is achieved with a battery composed of methanol/air fuel cells of the type mentioned at the beginning. Further embodiments of the invention are subject-matter of the subclaims.

The most important characteristic feature of the invention is that the electrode area in a compartment is divided into individual electrodes to obtain a fuel cell battery of high voltage. All the cells are connected in series. By subdividing the electrode area in this way almost no active area is wasted since, in the case of a large-area electrode, the frame around the individual electrodes would likewise have to be present as a current offlead. The subdivision into a plurality of individual electrodes within a compartment also serves to achieve an optimal geometry for leading off the current. This is because ohmic losses are lower with long, narrow electrodes than with square electrodes of the same area. The individual electrodes are separated from each other by narrow insulating webs.

To avoid high pressure losses in the airflow, the width of the batteries is limited and the necessary volume is obtained from an increased height and length. Height and length should ideally be the same to exploit the space saving potential of an axial blower for the air supply in full. In a simple construction according to the invention, the air flow in the cathode compartments is transverse to the methanol flow in the anode compartments.

The methanol is fed separately to each anode compartment via an inlet hole. This makes it possible in the event of failure, for example leakage, to empty a compartment and to bypass the then inoperable electrodes. In a case such as this, the power output of the fuel cell battery is only reduced insubstantially, and there is no need to replace the whole battery.

It is also advantageous to put all the connection lugs of the electrodes and their interconnections outside the compartments. This makes it possible to bypass individual failing electrodes and hence to keep the fuel cell battery in operation.

However, it is also possible to effect the serial connection of individual electrodes within a compartment via the longitudinal webs of the offlead frames, in which case only the connection lugs of the extreme right-hand side and left-hand side electrodes are led outward for further connection.

An illustrative embodiment of the invention is diagrammatically depicted and explained in more detail in the drawings, where FIG. 1 shows a detail of the fuel cell battery;

Figure 1:
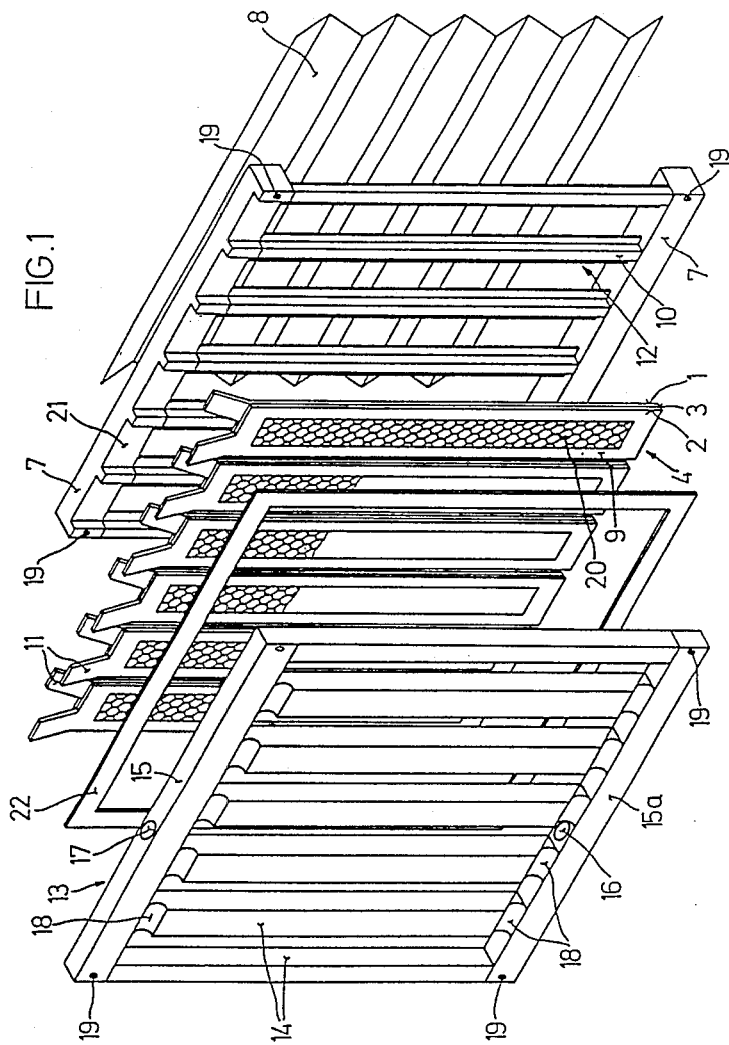
Figure 2:
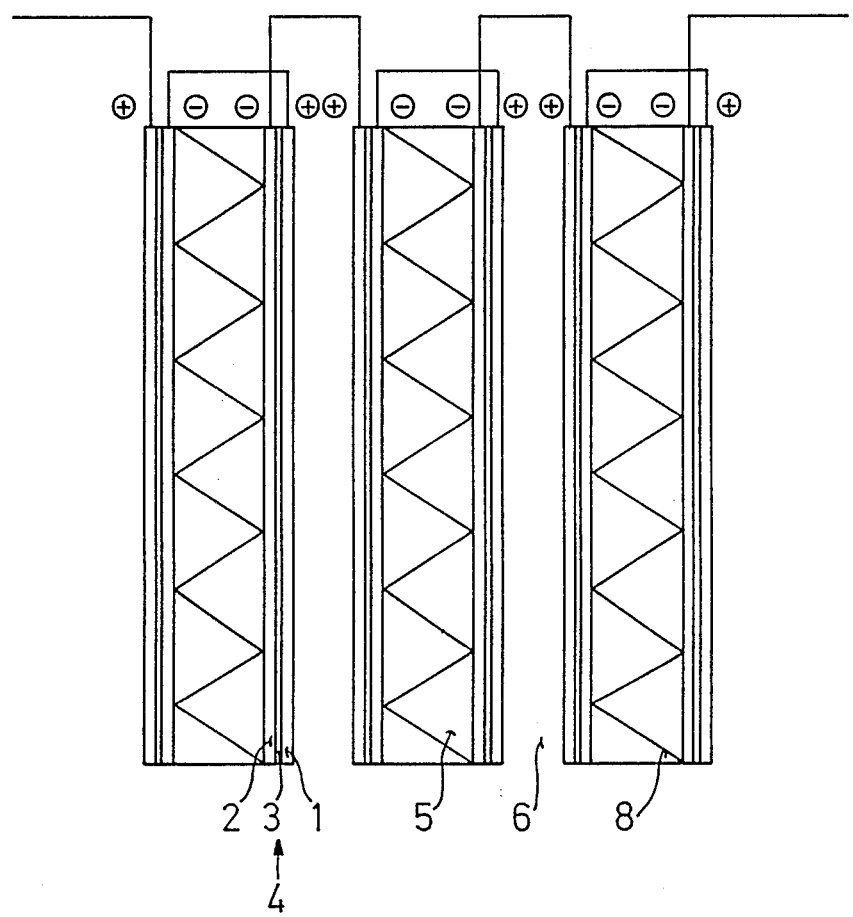
FIG. 2 shows the principle of the electrode and compartment arrangement.

The methanol/air fuel cell battery according to the invention comprises a periodic sequence of spacers 7, 13, which serve to construct the cathode compartments 5 and the anode compartments 6, an air guide arrangement 8 in the cathode compartment 5, and also prefabricated electrode units 4, the actual fuel cells, which comprise anode 1, cathode 2 and anion exchanger membrane 3.

The individual cells are connected in series. The airflow through cathode compartment 5 is perpendicular to the methanol feed, thereby producing a constructionally simple-to-control mass flow.

The fuel cell batteries according to the invention are built up from two different spacers 7, 13 which have several functions. They comprise injection moldings of methanol-resistant plastics, such as high density polyethylene or polypropylene. To obtain increased stiffness and high dimensional stability, these plastics can additionally be filled with mineral fillers such as talcum, chalk or wollastonite.

The cathode compartments 5 are constructed from two mutually mirror image spacers 7 which also guide the airflow and contain the base and sealing surfaces for the electrode units and the insulating webs 10 for keeping apart the electrodes 4.

To guide the airflow and to receive the contact force applied to the electrodes 4, the cathode compartments 5 contain concertinalike lamellae 8 which can be injection molded from stiff thermoplastics such as nylon-6, nylon-6.6, polyethylene terephthalate, polybutylene terephthalate or polypropylene and, to increase the stiffness, may optionally contain reinforcing fillers.

The electrode units 4 are placed with the cathode side on the spacers 7, while the offlead frame 9 acts as a sealing surface. The sealant can be an elastomer printed as a thin film on the offlead frame 9 and vulcanized in situ. The upper transverse web contains in each case gaps 21 for passing through the contact lugs 11 which are welded to one another after the battery has been completely assembled.

The height of the insulating web 10 is less than the total thickness of the electrode unit 4, so that in each case the electrodes are forced via longitudinal webs 14 in the anode chamber 6 against the sealing surface over the entire length. To this end, the longitudinal web 14 in the spacer 13 of the anode chamber 6 are each constructed sufficiently wide that each exerts contact pressure on two adjacent offlead frames 9.

For optimal utilization of the volume, the cathode compartments 5 are bounded in each case by two cathodes 2 of successive cells and the anode compartments 6 in each case by two anodes 1 of successive cells. Consequently, the utilized capacity of the compartments is doubled and the volume required virtually halved.

The electrode offleads 20 can be nickelized copper wire networks welded to a copper frame. Easier to mass produce, however, are perforated plates, which are producible in one or two steps from copper sheet by chipless forming and blanking. The holes in the perforated plates are around 0.5 mm in diameter and may be circular in cross-section or in particular hexagonal, honeycomblike (20). The holes may be produced not only by blanking but also by laser beam. A further way of producing regular structures of hole diameters from 20 to 800 $\mu$m and wall thickness from 1 to 500 $\mu$m, the electrodes can be produced by means of a microstructuring process. To this end, a resist structure is produced in a plastics film by deep X-ray lithography using synchrotron radiation. The film is irradiated through an appropriate mask. The irradiated areas in the film are washed out, and the bared structures are electroplated with nickel. The metal structure thus produced is used as a mold insert for the mass production of plastics structures by injection molding. The plastics structure is then subjected to electroforming to produce the desired nickel electrode.

About half the end surface length of the offlead frame is used as contact lug 11.

After the electrodes have been filled with the particular catalyst and said catalyst has been activated, anode and cathode are connected pairwise via a polymer electrolyte 3, which can also serve to separate anode and cathode electrically. In addition, the mutually facing surfaces of the offlead frames of cathode 2 and anode 1 can be insulated from each other by a plastics film from 20 to 100 $\mu$m in thickness. This insulator can be applied in the form of a hot-melt adhesive for metal.

The spacers 13, which form the anode compartments 6, contain in the bottom most transverse web 15 a central hole 16 for the methanol feed and at the upper most transverse divider 15a a boltable venting orifice 17 which serves for removing air bubbles from the first fill.

The longitudinal webs 14 which serve for providing contact pressure against the electrodes have notches 18 which are necessary for distributing the methanol between the individual webs 14.

The locating of the spacers 7, 13 and the production of the contact pressure forces are accomplished by means of pins which are guided through holes 19 in the outer webs. The anode compartments 6 are sealed off from the outside by inserting thin elastomer seals 22 between the outer webs.

Figure 3:
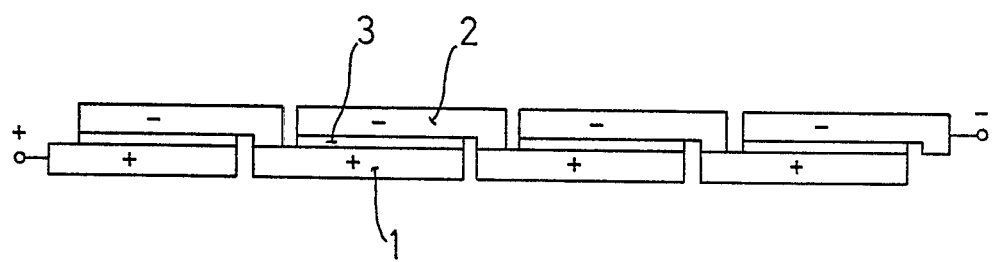
FIG. 3 shows the connection in series of individual electrodes within the compartment.

If the anodes and cathodes within a compartment are to be connected in series (FIG. 3), the combination of anode and cathode offleads are each produced from copper sheet as a part 1, 2. After nickelization, first an offlead part, for example cathode 2, is filled with active material and the material is activated. The second offlead is then filled with the other electrode material and activated. The one-part combinations of anode and cathode are then connected to one another in the manner shown by way of the anion exchanger polymer 3.

By way of example, there now follow the key dimensions of a fuel cell battery having a power output of about 25 kW (without blower):

The active area of an electrode is about 80 cm$^2$ for a current density of 1 A/cm$^2$. In the case of 324 individual cells and an operating voltage of around 1 V, the total voltage is about 320 V. The battery is composed of 27 doublesidedly active compartments and 6 individual cells per compartment. The electrodes are each 1 mm in thickness and, inclusive of offlead frames, 30 mm in width and 410 mm in length. The offlead frames, which are made of copper, are 5 mm in width. The energy loss due to ohmic losses via the offlead frame is scarcely 3%. The width of the webs insulating the offleads is 2 mm, the thickness 1.5 mm. The clear width of the anode compartments is 3 mm and that of the cathode compartments, including inserted electrode units (2 mm thick), 14 mm. The height of the battery is 460 mm, the length likewise about 460 mm and the width 250 mm.

Consequently, the volume of the fuel cell battery is about 53 liters, which corresponds to a power output per unit volume of about 0.5 kW/l.

I claim:

1. A battery composed of methanol/air fuel cells which in turn are composed of a cathode, and anode and a CO$_2$-permeable anion exchanger membrane as electrolyte, wherein a plurality of cathodes and anodes are in a parallel arrangement in a common cathode compartment and anode compartment, respectively.

2. A battery as defined in claim 1, wherein the cathode compartments are bounded in each case by two cathodes of successive methanol/air fuel cells and the anode compartments in each case by two anodes of successive methanol/air fuel cells.

3. A battery as defined in claim 1, wherein the offleads of the cathodes and of the anodes have a honey comb structure.

4. A battery as defined in claim 1, wherein the offleads are made of nickel.

* * * * *

UNITED STATES PATENT AND TRADEMARK OFFICE
CERTIFICATE OF CORRECTION

PATENT NO. : 4,769,296

DATED : September 6, 1988

INVENTOR(S) : Hans-Josef STERZEL

It is certified that error appears in the above-identified patent and that said Letters Patent is hereby corrected as shown below:

On the Title Page add:

[30] Foreign Application Priority Data

November 25, 1986 [DE] Fed. Rep. of Germany...3640206

Signed and Sealed this

Seventh Day of March, 1989

Attest:

DONALD J. QUIGG

*Attesting Officer*   *Commissioner of Patents and Trademarks*